US008622692B1

(12) United States Patent
Liang

(10) Patent No.: US 8,622,692 B1
(45) Date of Patent: Jan. 7, 2014

(54) HIGH TEMPERATURE TURBINE STATOR VANE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 503 days.

(21) Appl. No.: 12/966,149

(22) Filed: Dec. 13, 2010

(51) Int. Cl.

| | |
|---|---|
| ***F01D 5/14*** | (2006.01) |
| ***F03D 11/00*** | (2006.01) |
| ***F04D 29/38*** | (2006.01) |

(52) U.S. Cl.
USPC ..................... 415/115; 415/209.4; 415/210.1; 416/97 R

(58) Field of Classification Search
USPC ................... 29/889.2, 889.21, 889.7, 889.72, 29/889.721; 415/191, 115, 209.4, 210.1; 416/97 R
See application file for complete search history.

(56) References Cited

U.S. PATENT DOCUMENTS

| | | | | |
|---|---|---|---|---|
| 5,465,780 | A * | 11/1995 | Muntner et al. | 164/516 |
| 5,927,130 | A * | 7/1999 | Watson et al. | 72/269 |
| 6,129,257 | A * | 10/2000 | Xu et al. | 228/44.3 |
| 6,409,473 | B1 * | 6/2002 | Chen et al. | 415/191 |
| 6,579,061 | B1 * | 6/2003 | Heyward et al. | 415/189 |
| 6,717,095 | B2 * | 4/2004 | Arness et al. | 219/69.17 |
| 7,070,386 | B2 * | 7/2006 | Kessler et al. | 415/115 |

* cited by examiner

*Primary Examiner* — Edward Look
*Assistant Examiner* — Christopher J Hargitt
(74) *Attorney, Agent, or Firm* — John Ryznic

(57) ABSTRACT

A high temperature resistant turbine stator vane with an air-foil section made from oxide dispersion strengthened (ODS) material extruded through a die, an internal cooling circuit is machined into the airfoil section after the extrusion, and then two endwalls are formed separately and then secured to the airfoil section ends to form the stator vane. Film cooling holes can be drilled into the airfoil section and the endwalls.

7 Claims, 3 Drawing Sheets

HIGH TEMPERATURE TURBINE STATOR VANE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to gas turbine engine, and more specifically to a turbine stator vane made from a high temperature resistant material.

2. Description of the Related Art Including Information Disclosed Under 37 CFR 1.97 and 1.98

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

The first stage rotor blade and stator vanes are exposed to the highest gas stream temperatures, with the temperature gradually decreasing as the gas stream passes through the turbine stages. The first and second stage airfoils (blades and vanes) must be cooled by passing cooling air through internal cooling passages and discharging the cooling air through film cooling holes to provide a blanket layer of cooling air to protect the hot metal surface from the hot gas stream.

Most stator vanes used in the large frame heavy duty industrial gas turbine engines are made of a single piece from a casting process because of the low cost and high yields. One stage or row of stator vanes can cost over one million dollars. Thus, low casting yields (when a large number of the cast parts are defective) can be very expensive.

One way to improve the efficiency of the turbine is by forming the turbine airfoils from even higher temperature resistant materials so that a higher turbine inlet temperature can be used. To allow for higher temperatures, materials such as directionally solidified (DS) metals or single crystal (SC) metals have been proposed. However, forming a SC vane from a single piece is cost prohibitive because of the very low yields. A single crystal metal is formed by growing the crystal from one end of the vane to the opposite end. This works well when the metal is just a straight piece, but when the two endwalls must be formed integral with the airfoil is when the difficulty arises. The endwalls are formed at 90 degrees from the airfoil section and therefore the single crystal growth does not occur because of the directional change. To solve this problem, the stator vane is made from several pieces that can then be joined together.

Oxide dispersion strengthened (ODS) materials and directionally solidified eutectic (DSE) alloys are materials that are known for high creep life and high oxidation resistance. Several materials from these classes have creep and oxidation lives about three times those measured for conventional superalloys. ODS materials use mechanical techniques during processing to evenly distribute hard oxide particles of sizes less than about 0.1 micron within a metallic matrix, with the particles serving to make deformation of the material more difficult. DSE alloys are characterized by carefully controlled chemistry and processing, which produce a unique microstructure comprising the inherent fibrous or, in some cases, lamellar structure of the eutectic phase, with the fibers or lamellae aligned along a desired axis of the cast part in a manner analogous to a fiber-reinforced composite. DSE materials are also notable for excellent fatigue life, with certain alloys having about three times the fatigue lives measured for conventional superalloys. The careful processing control needed to produce ODS and DSE alloys cause these materials to be prohibitively expensive. ODS formed alloys exhibit creep rupture lives exceeding those of commonly used single-crystal superalloys by a factor in the range from about 2 to about 10, where the test load is about 21 MPa at a temperature of about 1150 degree C. The chromium in the alloys, present from about 15 weight % to about 20 weight %, provides effective oxidation resistance to the Ni-based matrix.

BRIEF SUMMARY OF THE INVENTION

A turbine stator vane with an airfoil made from oxide dispersion strengthened (ODS) material extruded through a die and then the inner cooling circuit details are formed from an electric discharge machining (EDM) cutting process. The two endwalls can be formed from the same or a different material and then bonded to the airfoil to form a composite stator vane capable of withstanding higher gas stream temperatures.

DETAILED DESCRIPTION OF THE INVENTION

A turbine stator vane made from a high temperature resistant material such as an oxide dispersion strengthened (ODS) material extruded through a die, in which an inner endwall and an outer endwall are formed separately from the same or a different material, and then the airfoil is bonded to the endwalls to form the composite stator vane capable of withstanding higher temperatures than cast nickel alloy vanes. The materials used in the ODS process cannot be formed by conventional casting processes.

Figure 1:
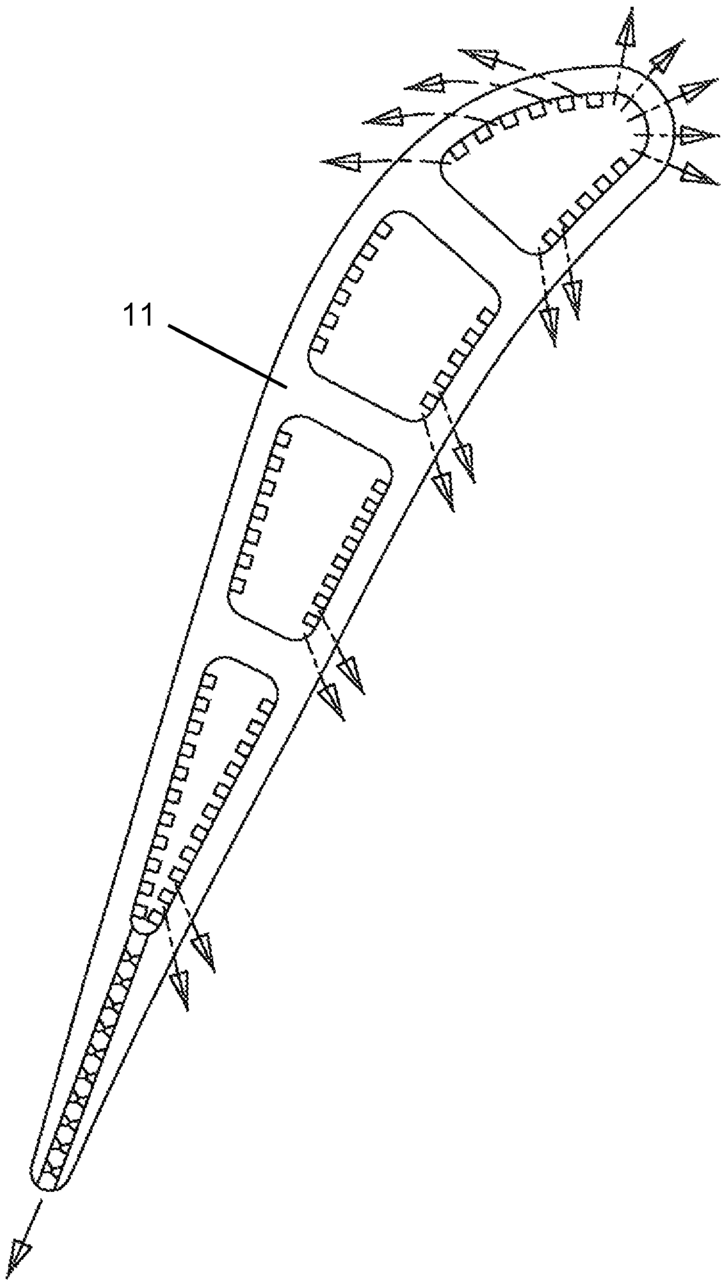
FIG. 1 shows a cross section view along a radial direction of the airfoil section of the stator vane of the present invention.

FIG. 1 shows a view of the airfoil section 11 of the vane with a leading edge having an arrangement of film cooling holes to form a showerhead arrangement and with one or more rows of gill holes on the pressure side and the suction side of the leading edge region. The airfoil is formed with one or more ribs extending across the two walls of the airfoil to form separate cooling air channels or passages. The channels include trip strips on the walls to enhance the heat transfer coefficient from the hot metal surface to the cooling air passing through the channels. A row of exit holes or exit channels are formed in the trailing edge region with pin fins extending across the walls and into the channels to enhance the heat transfer coefficient as well. Film cooling holes can also be drilled into the pressure side wall as shown by the arrows in FIG. 1. Other arrangements of film cooling holes can be formed within the airfoil section 11 depending upon the cooling requirements and the desired metal temperature of the vane.

The airfoil section 11 is formed from an oxide dispersion strengthened (ODS) material in which the material is extruded through a die having the general shape of the airfoil. After the extrusion process, certain features of the airfoil can be formed by machining such as with a wire electric discharge machining process to cut the features that cannot be formed from the extrusion process. These features that are machined after extrusion can include forming the internal cooling passages or channels and the trip strips. The film cooling holes and the trailing edge exit holes can be formed from EDM process.

An outer diameter (OD) endwall 12 and an inner diameter (ID) endwall 13 is formed separately from the airfoil section 11 and can be formed from the same material as the airfoil section 11 or from a different material to save in cost. The hottest section of the vane is along the middle of the airfoil section between the two endwalls, and therefore the endwalls will be operated at a lower temperature than the airfoil. Thus, a lower temperature material can be used for the two endwalls and with a lower cost of production. The two endwalls 12 and 13 can be extruded through a die like that of the airfoil section 11, or they can be cast using the investment casting process from a material such as the Nickel superalloys. Some machining after the casting can also be used to form features difficult to cast such as any film cooling holes that may be required.

Figure 2:
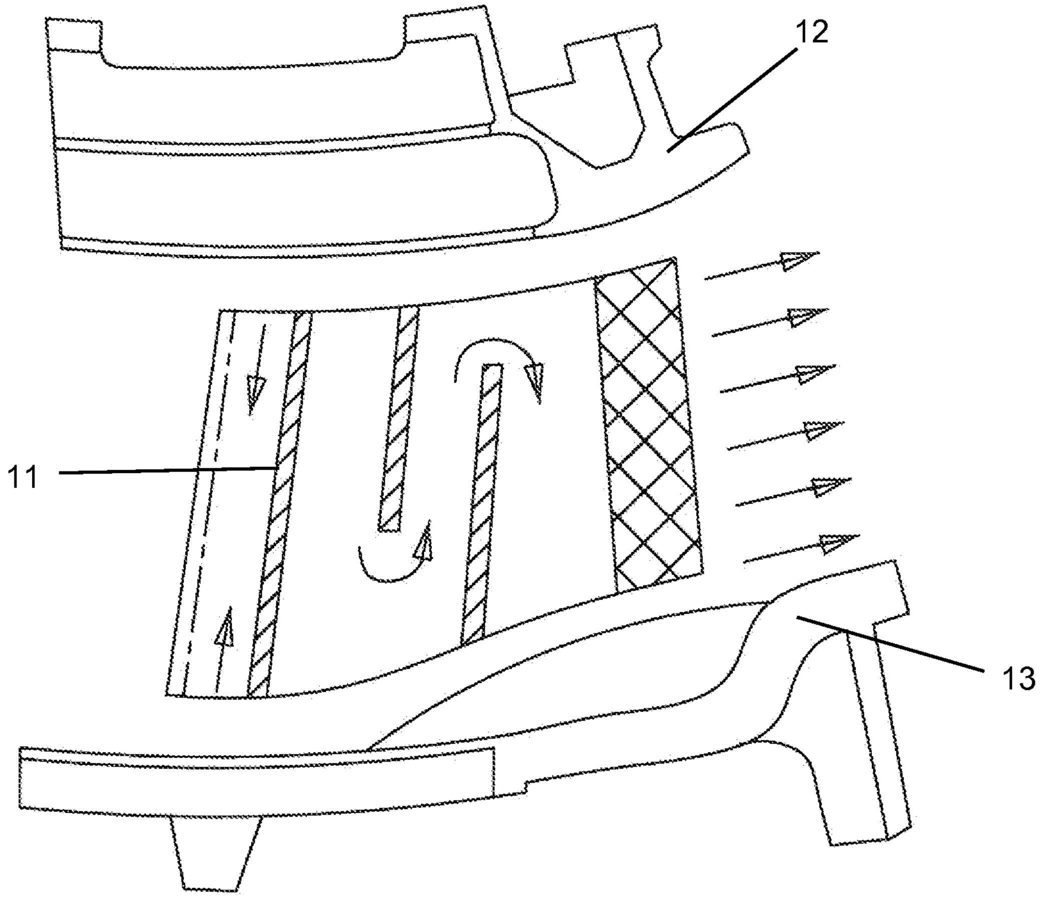
FIG. 2 shows an exploded view of the three pieces that form the stator vane of the present invention.
Figure 3:
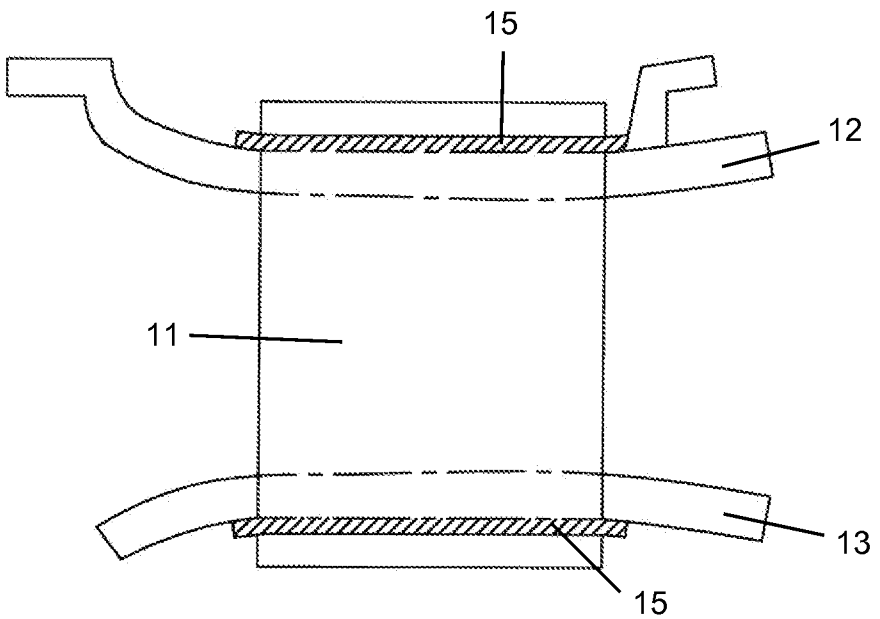
FIG. 3 shows a side view of the stator vane of the present invention in an assembled state.

FIG. 2 shows an exposed view of the three parts used to form the stator vane. The airfoil section 11 includes a leading edge cooling air supply channel to feed the film cooling holes for the leading edge region of the airfoil, and a three-pass serpentine flow cooling circuit located in the mid-chord section that feeds the row of trailing edge (TE) exit holes. The TE exit holes are shown in FIG. 2 as cross drilled exit holes in which one row flows upward and a second adjacent row flows downward. Other exit hole arrangements can be formed such as straight through exit holes or a TE channel with pin fins extending across the channel.

Figure 4:
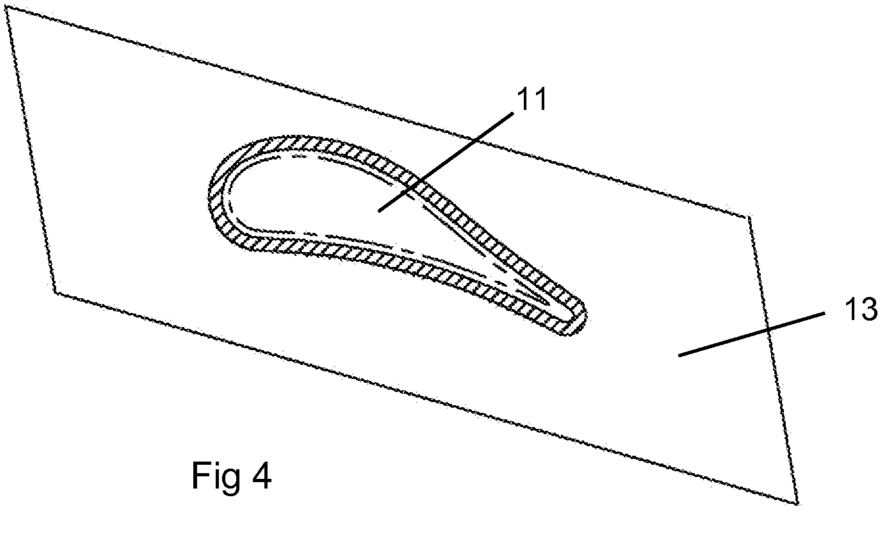
FIG. 4 shows a top view of the airfoil and the inner endwall of the stator vane of the present invention.
Figure 5:
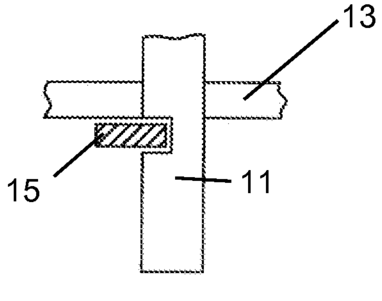
FIG. 5 shows a detailed view of the airfoil and endwall of the present invention with a seal secured within a seal groove.

The two endwalls 12 and 13 are secured to the airfoil section 11 using a process such as brazing along with peripheral locking seals to both seal the interface between the endwall and the airfoil and to lock the pieces together. The airfoil section 11 extends through an airfoil shaped opening in each of the two endwalls. The two ends of the airfoil section 11 is covered by a cover plate or something that will block the cooling passages and form the cooling circuit for the vane so that the cooling air flows through the vane as intended. FIG. 4 shows one endwall with the airfoil section extending through it. FIG. 5 shows a detailed view of one of the locking features to secure the airfoil 11 to the endwall. A seal groove is formed in the endwall 11 for insertion of a seal 15 that will both seal and lock the airfoil 11 to the endwall 13. Both endwalls 12 and 13 are sealed and locked ion this manner.

The stator vane of the present invention forms a stator vane with an ODS airfoil with a simplified fabrication process while retaining the high cooling performance of the prior art cast vane design. The ODS vane of the present invention includes a showerhead cooled airfoil leading edge, multiple pass cooling channels for the airfoil mid-chord region with pressure side and suction side film cooling, radial extending fins on the internal cooling air channels, and cross drilled diamond pedestal trailing edge cooling channels for the trailing edge region. Also, both ends of the airfoil are open and free from any endwall geometry constraints. The ODS stator vane of the present invention with therefore retain the airfoil structural integrity, provide positive cooling, and improve the vane oxidation and erosion capability.

I claim the following:

1. A process for forming a turbine stator vane having an airfoil section extending between an inner diameter endwall and an outer diameter endwall, the process comprising the steps of:

forming the airfoil section by extruding oxide dispersion strengthened material through a die having a shape of an outer airfoil section;

machining an internal cooling air circuit within the extruded airfoil section;

forming the inner diameter endwall with an opening having a shape of the airfoil section on an inner diameter end;

forming the outer diameter endwall with an opening having a shape of the airfoil section on an outer diameter end; and, securing the two endwalls to the airfoil section to form the stator vane.

2. The process for forming a turbine stator vane of claim 1, and further comprising the step of:

after extruding the airfoil section, drilling a showerhead arrangement of film cooling holes in a leading edge region of the airfoil section.

3. The process for forming a turbine stator vane of claim 1, and further comprising the step of:

after extruding the airfoil section, drilling a row of exit holes in a trailing edge region of the airfoil section connected to the internal cooling air circuit.

4. The process for forming a turbine stator vane of claim 1, and further comprising the steps of:

forming a seal groove in the airfoil section near to where a surface of the endwall will be located; and, securing a seal within the seal groove after the airfoil section is positioned within the endwall opening to secure the endwall to the airfoil.

5. The process for forming a turbine stator vane of claim 1, and further comprising the step of:

forming the two endwalls by casting them from a material different than the airfoil section.

6. A turbine stator vane comprising:

an airfoil section formed from an oxide dispersion strengthened material extruded through a die;

an inner diameter endwall and an outer diameter endwall formed as separate pieces from the airfoil section and secured to the ends of the airfoil section;

a leading edge cooling channel and a showerhead arrangement of film cooling holes drilled onto the leading edge region of the airfoil section;

a multiple pass serpentine flow cooling circuit formed within a mid-chord region of the airfoil section; and, a trailing edge cooling circuit with trailing edge exit holes to discharge cooling air from the airfoil section.

7. The turbine stator vane of claim 6, and further comprising:

the inner and outer diameter endwalls are formed from a metal suitable for casting.

* * * * *